UNITED STATES PATENT OFFICE.

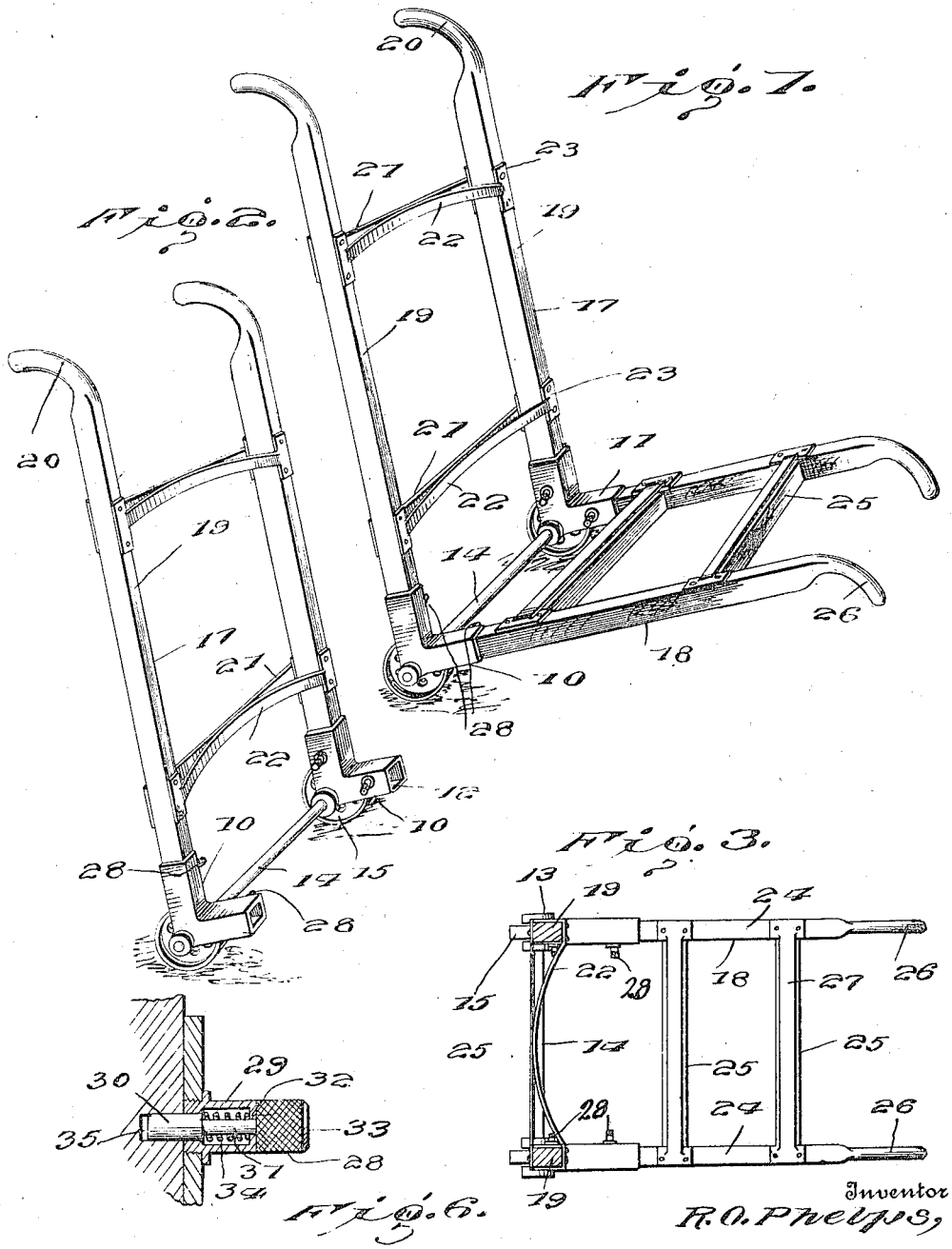

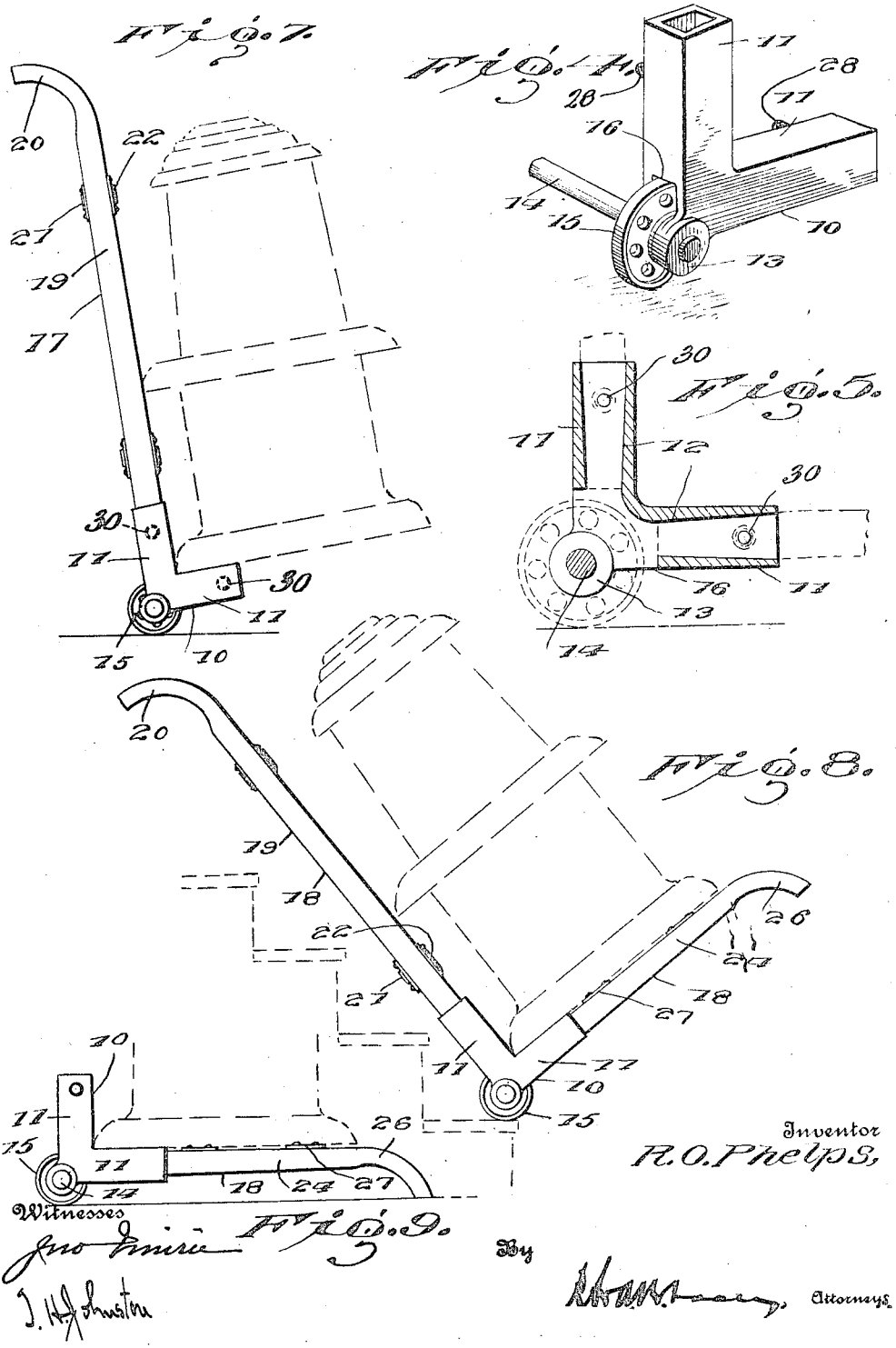

ROY O. PHELPS, OF MINNEAPOLIS, MINNESOTA.

HAND-TRUCK.

1,150,964.                    Specification of Letters Patent.    Patented Aug. 24, 1915.

Application filed May 19, 1914. Serial No. 839,598.

*To all whom it may concern:*

Be it known that I, ROY O. PHELPS, citizen of the United States, residing at Minneapolis, in the county of Hennepin and State of Minnesota, have invented certain new and useful Improvements in Hand-Trucks of which the following is a specification.

This invention relates to trucks and more particularly to an improved hand truck especially designed for use in connection with the handling of cumbersome or heavy objects.

The primary object of the invention is to provide a truck having coacting handle frames either of which may be attached to or detached from the truck as desired, and may thus be used in conjunction with each other or independently.

The invention has as a further object to provide a truck of the above described character wherein one of the handle frames is so constructed as to provide a platform for a stove of such character that when the truck is brought to rest, the body portion of the stove may be slid from said platform on to the base of the stove.

A further object of the invention is to provide a truck including integrally formed socket members having angularly disposed arms and provided with ears at the intersections of said arms which form journals to receive a shaft on which is mounted supporting wheels which are arranged between the ears of said socket members, to thus provide a simple and durable structure.

The invention also has as a further object to provide a truck carrying catch members arranged to engage the removable handle frames to thus maintain said frames securely in position. And a still further object of the invention is to generally improve the construction and increase the efficiency of devices of the above described character.

With these and other objects in view my invention will be more fully described, illustrated in the accompanying drawings and then specifically pointed out in the claims which are attached to and form a part of this application.

In the accompanying drawings: Figure 1 is a perspective view of my improved truck showing the handle frames in position thereon. Fig. 2 is a similar view showing one handle frame removed, Fig. 3 is a side elevation of the truck, one handle frame being shown in section, Fig. 4 is a fragmentary detail perspective view of one of the socket members and the adjacent supporting wheel. Fig. 5 is a vertical sectional view taken through one of the socket members and particularly showing the tapered walls of the sockets thereof, Fig. 6 is a fragmentary sectional view showing one of the catch members arranged to engage the removable handle frame, Fig. 7 is a side elevation showing the preferred manner of using the truck in transporting a stove, one of the handle frames being removed and the stove being shown in dotted lines, Fig. 8 is a similar view showing both handle frames in position upon the truck, the stove which is shown in dotted lines being illustrated as resting upon one of said frames, this figure also showing the manner of using the truck in carrying a stove either up or down stairs, the stairs being shown in dotted lines, and Fig. 9 is a side elevation showing one of the handle frames removed and the stove illustrated in dotted lines as resting upon the other handle frame in position to be slid or moved on to the base of the stove.

Corresponding and like parts are referred to in the following description and indicated in all the views of the drawings by the same reference characters.

My improved truck is especially designed for use in moving stoves or other heavy objects but it is to be understood that the device may be employed for many other purposes and I do not therefore, wish to limit myself or have it understood that the truck can not be used in other ways, in describing the use of the invention in connection with the handling of stoves.

Referring now more particularly to the drawings, my improved truck includes socket members 10 which are preferably constructed of suitable metal and are each formed with angularly disposed arms 11 which are preferably arranged at substantially right angles to each other. The arms 11 of each of the socket members 10 are preferably substantially rectangular and are hollow, the walls of each of said arms converging toward the inner extremities thereof to provide tapered sockets 12.

At the intersection of the arms 11, each of the socket members 10 is provided with oppositely disposed ears 13 which project from the outer face of the socket members and are laterally enlarged and provided with suitable apertures adapted to receive a shaft 14 which extends between and connects the socket members 10. Supporting wheels 15 are mounted upon the shaft between the ears 13 of each of said socket members which are each recessed as shown at 16 to receive said wheels. It will be observed that a rigid construction is provided and that the socket members 10 are rigidly connected to the shaft 14.

The tapered sockets 12 formed in each of the socket members 10 are substantially identical, and handle frames 17 and 18 are provided which are receivable in said sockets interchangeably. The handle frame 17 includes the side bars 19 which terminate at their outer extremities in the downwardly curved handles 20, the opposite extremities of said bars being tapered to fit snugly within the sockets 12 of the socket members 10. Connecting the side bars 19 are cross braces 21 and 22 preferably arranged in pairs, a pair being disposed adjacent each extremity of said side bars. The cross braces 21 and 22 may be formed from suitable metallic strips and are provided with terminal T-shaped heads 23 which are secured to the edges of the side bars. The cross braces 21 are preferably straight and are arranged upon the rear edges of the side bars 19 while the cross braces 22 are arranged upon the upper edges of said side bars, and are longitudinally bowed to rest against the cross braces 21 as shown.

The handle frame 18 is similar in construction to the frame 17 but is preferably shorter and includes side bars 24 which are connected by cross braces 25. The side bars 24 are each tapered at one extremity to fit within the sockets 12 of the socket members and are downwardly curved at the opposite extremity to provide handles 26. Wear plates 27 are arranged upon the upper faces of the cross braces 25, such plates being similar in construction to the cross braces 21 and 22 heretofore described.

It is to be observed that the frames 17 and 18 may each be connected with or disconnected from the socket members 10 as desired, the frame 17 being particularly designed for handling the truck while the frame 18 is more particularly intended to serve as a platform. Arranged upon the inner confronting walls of the socket members 10 are catch members 28, one of said catch members being preferably disposed upon each arm 11 of each of said socket members. Each of said catch members includes a barrel 29 which is open at one end and exteriorly screw threaded at its opposite extremity to engage within a suitable screw threaded aperture formed in the arm. Slidably mounted in said barrel is a plunger which is formed with a preferably cylindrical head 30 having a stem 31 which extends through the closed end 32 of the barrel and is formed with a terminal thumb nut 33. Surrounding the stem 31 and bearing between the adjacent extremity of the head 30 of the plunger and the closed end 32 of the barrel is a helical spring 34, said spring normally acting to maintain the head 30 of the plunger projected into the adjacent tapered socket 12. The adjacent portions of the side bars 19 and 24 are each provided with suitable recesses 35 in which the heads 30 of the catch members engage when the frames 17 and 18 are seated within the sockets 12. It will be observed that said frames are detachably connected with the socket members and are securely held in such position by the catch members 28. It will also be noted that the catch members 28 are so arranged as to be out of the way and are so disposed as to be protected from injury due to coming in contact with other objects. In Fig. 2 of the drawings I have shown the frame 18 removed from the socket members 10, the frame 17 together with the laterally projecting arms of the socket members 10 providing an ordinary truck. Under ordinary circumstances my improved truck may be used in this form as shown in Fig. 7 of the drawings wherein a stove is illustrated in dotted lines in position upon the truck, the stove resting upon the laterally projecting arms of the socket-members 10. In order to facilitate the handling of substantially cylindrical or round objects, the cross braces 22 are longitudinally bowed to receive such objects.

Where it is desired to move a stove downstairs for instance, as shown in Fig. 8 of the drawings, or in any case where it is desired to place the body portion of the stove upon its base, as shown in Fig. 9 of the drawings, the frame 18 is also preferably employed in connection with the frame 17. It will be observed that the cross braces 25 of the frame 18 are straight and are provided with wear plates, and such frame forms substantially a platform for the stove when the truck is brought to rest, as shown in Fig. 9 of the drawings. When thus used the handles 26 of the frame 18 form legs so disposed as to support the frame 18 in a substantially horizontal position and as will be obvious, the stove may be slid or moved from off of the frame 18 directly onto its base. Under ordinary circumstances, the frame 18 may be either employed or not as desired, but said frame will be found very convenient when handling objects in any cases where it is necessary to tilt the truck to any great angle such as would ordinarily dislodge the object carried by the truck, such for instance in the moving of stoves either up or down stairs as shown in Fig. 8 of the drawings. Under such circumstances, the frame 18 may be employed to advantage, since any possibility of the object carried by the truck from falling therefrom is obviated.

It will therefore be seen that I provide in my improved truck a construction wherein the device may be used as an ordinary shipper's truck or in the capacity of a truck especially adapted to the handling of stoves or other heavy objects. It will also be noted that my improved truck when used in this latter capacity provides a platform for the object carried by the truck when the truck is brought to rest. It will further be seen that I provide a truck which is simple in construction but which nevertheless provides a very rigid structure and wherein the handle frames employed may each be readily detached or applied as desired.

Having thus described my invention what I claim and desire to secure by Letters Patent is:

1. A device of the character described including socket members having angularly disposed arms arranged in pairs and provided with sockets, a shaft connecting said members, supporting wheels mounted upon the shaft, and a handle frame disposed for detachable connection within the sockets of either pair of arms.

2. A device of the character described including socket members having angularly disposed arms arranged in pairs and provided with sockets, spaced ears formed on each of said socket members at the intersection of the arms thereof, a shaft connecting said members and extending through said ears, supporting wheels mounted upon the shaft, one between the ears of each socket member, and a handle frame disposed for detachable connection within the sockets of either pair of arms.

3. A device of the character described including socket members having angularly disposed arms arranged in pairs and provided with tapered sockets, supporting wheels operatively connected to said members, and a handle frame including side bars each tapered at one extremity and arranged to seat in said sockets, said handle frame being disposed for detachable connection within the sockets of either pair of arms.

4. A device of the character described including socket members having angularly disposed arms arranged in pairs and provided with sockets, spaced ears formed on each of said members at the intersection of the arms thereof, said members being recessed adjacent said ears to receive supporting wheels, supporting wheels operatively connected to said members and disposed in said recesses, said wheels being arranged one between the ears of each pair, and a handle frame disposed for detachable connection within the sockets of either pair of arms.

5. A device of the character described including socket members having angularly disposed arms arranged in pairs and provided with sockets, supporting wheels operatively connected to said members, catch members arranged upon each of said arms and disposed to normally project into the adjacent socket thereof, and a handle frame disposed to seat within the sockets of either pair of arms in engagement with the catch members thereof.

6. A device of the character described including socket members having angularly disposed arms arranged in pairs and provided with sockets, supporting wheels operatively connected to said members, a catch member arranged upon each of said arms, each of said catch members including a spring pressed plunger arranged to normally project into the socket of the adjacent arm, and a handle frame including side bars disposed to seat within the sockets of either pair of arms, each of said side bars having a suitable recess formed therein in which the catch member of the adjacent arm is disposed to engage.

7. A device of the character described including socket members having angularly disposed arms arranged in pairs and provided with sockets, supporting wheels operatively connected to said members, a catch member arranged upon each of said arms, and a handle frame disposed for detachable connection within the sockets of either pair of arms in engagement with said catch members, each of said catch members including a barrel having screw threaded engagement with the wall of the adjacent arm, said barrel being closed at one end and provided with an aperture in said end, a plunger including a head mounted to reciprocate in said barrel, a stem formed on the head and extending through the aperture formed in the closed end of the barrel, a thumb nut arranged exteriorly of the barrel and secured to said stem, and a spring surrounding the stem and interposed between the head of the plunger and the closed end of the barrel, said spring being adapted to normally maintain the head of the plunger projected into the socket of the adjacent arm to engage the handle frame.

8. A device of the character described including socket members having angularly disposed arms arranged in pairs and provided with sockets, supporting wheels operatively connected to said members, a catch member detachably connected to each of said arms, said catch members being adapted to automatically engage a handle frame, and a handle frame disposed for detachable connection within the sockets of either pair of arms in engagement with said catch members.

9. A device of the character described including socket members having angularly disposed arms arranged in pairs and provided with sockets, supporting wheels operatively connected to said arms, and a handle frame disposed for detachable connection within the sockets of either pair of arms, said frame including side bars connected by cross braces, each of said braces being formed from a suitable metallic strip and provided with T-shaped heads at the extremities thereof arranged to engage similarly disposed edges of each of said bars.

10. A device of the character described including socket members having angularly disposed arms arranged in pairs and provided with sockets, supporting wheels operatively connected to said members, and a handle frame disposed for detachable connection within the sockets of either pair of arms, said frame including side bars, pairs of oppositely disposed cross braces connecting said bars, the braces of each pair being secured to the upper and lower edges of said bars, the braces arranged upon the lower edges of the bars being straight and the braces arranged upon the upper edges of the bars being longitudinally bowed to rest against the adjacent lower braces.

11. A device of the character described including socket members having angularly disposed arms arranged in pairs and provided with sockets, supporting wheels operatively connected to said members, and coacting handle frames disposed for detachable connection within the sockets of either pair of arms, one of said frames being adapted to support an object longitudinally and the other of said frames providing a base for said object.

12. A device of the character described including socket members having angularly disposed arms arranged in pairs and provided with sockets, supporting wheels operatively connected to said members, and a handle frame disposed for detachable connection within the sockets of either pair of arms, said frame including side bars, cross braces connecting said arms, and wear plates arranged upon said cross braces.

In testimony whereof I affix my signature in presence of two witnesses.

ROY O. PHELPS. [L. S.]

Witnesses:
 EDWIN A. HENDRICKS,
 GEO. E. NORTHROP.